United States Patent
Sasakawa et al.

(10) Patent No.: US 9,543,614 B2
(45) Date of Patent: Jan. 10, 2017

(54) NONAQUEOUS ELECTROLYTE BATTERY AND BATTERY PACK

(71) Applicant: KABUSHIKI KAISHA TOSHIBA, Minato-ku (JP)

(72) Inventors: Tetsuya Sasakawa, Yokohama (JP); Yoshiyuki Isozaki, Tokyo (JP); Hidesato Saruwatari, Kashiwazaki (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 14/659,804

(22) Filed: Mar. 17, 2015

(65) Prior Publication Data

US 2016/0036090 A1    Feb. 4, 2016

(30) Foreign Application Priority Data

Jul. 31, 2014    (JP) ................................. 2014-156881

(51) Int. Cl.
*H01M 10/052* (2010.01)
*H01M 10/0525* (2010.01)
(Continued)

(52) U.S. Cl.
CPC ......... *H01M 10/0525* (2013.01); *H01M 4/131* (2013.01); *H01M 4/364* (2013.01);
(Continued)

(58) Field of Classification Search
CPC ............................ H01M 4/485; H01M 10/052
See application file for complete search history.

(56) References Cited

U.S. PATENT DOCUMENTS

| | | | |
|---|---|---|---|
| 2007/0218357 A1* | 9/2007 | Takagi | H01M 4/382 429/221 |
| 2008/0076030 A1 | 3/2008 | Inagaki et al. | |
| 2011/0045328 A1 | 2/2011 | Inagaki et al. | |
| 2011/0085965 A1* | 4/2011 | Lee | B82Y 30/00 423/598 |
| 2012/0107692 A1* | 5/2012 | Harada | C01G 23/002 429/231.2 |
| 2012/0328930 A1 | 12/2012 | Inagaki et al. | |
| 2013/0252076 A1 | 9/2013 | Hoshina et al. | |
| 2016/0036010 A1 | 2/2016 | Saruwatari et al. | |
| 2016/0036040 A1 | 2/2016 | Takami et al. | |
| 2016/0036090 A1 | 2/2016 | Sasakawa et al. | |
| 2016/0036093 A1 | 2/2016 | Hoshina et al. | |

FOREIGN PATENT DOCUMENTS

JP    9-199179 A    7/1997
JP    2005-302578 A    10/2005
(Continued)

OTHER PUBLICATIONS

Extended European Search Report issued Dec. 9, 2015 in Patent Application No. 15159000.7.
(Continued)

*Primary Examiner* — Stewart Fraser
*Assistant Examiner* — Olatunji Godo
(74) *Attorney, Agent, or Firm* — Oblon, McClelland, Maier & Neustadt, L.L.P.

(57) ABSTRACT

According to one embodiment, a nonaqueous electrolyte battery includes a container, a positive electrode housed in the container, a negative electrode housed in the container, and a nonaqueous electrolyte housed in the container. The positive electrode includes a positive electrode active material represented by a general formula $LiMO_2$ (M is one or more elements selected from a group consisting of Ni, Co, and Mn). The negative electrode is spatially separated from the positive electrode and includes a titanium-containing oxide as a negative electrode active material. A potential of the positive electrode is 3.75 V or more vs. $Li/Li^+$, when an open circuit voltage of a nonaqueous electrolyte battery is 2.17 V.

11 Claims, 4 Drawing Sheets

(51) Int. Cl.
*H01M 10/42* (2006.01)
*H01M 4/485* (2010.01)
*H01M 4/131* (2010.01)
*H01M 4/505* (2010.01)
*H01M 4/525* (2010.01)
*H01M 4/36* (2006.01)
*H01M 4/02* (2006.01)
*H01M 2/10* (2006.01)

(52) U.S. Cl.
CPC ........... *H01M 4/485* (2013.01); *H01M 4/505* (2013.01); *H01M 4/525* (2013.01); *H01M 10/4257* (2013.01); *H01M 2/1077* (2013.01); *H01M 2004/027* (2013.01); *H01M 2004/028* (2013.01); *H01M 2010/4271* (2013.01); *Y02E 60/122* (2013.01); *Y02T 10/7011* (2013.01)

(56) References Cited

FOREIGN PATENT DOCUMENTS

| | | |
|---|---|---|
| JP | 3866740 B2 | 10/2006 |
| JP | 2007-335307 A | 12/2007 |
| JP | 2011-44312 A | 3/2011 |
| JP | 2012-99287 A | 5/2012 |

OTHER PUBLICATIONS

Extended European Search Report issued Dec. 12, 2015 in Patent Application No. 15159000.7.

\* cited by examiner

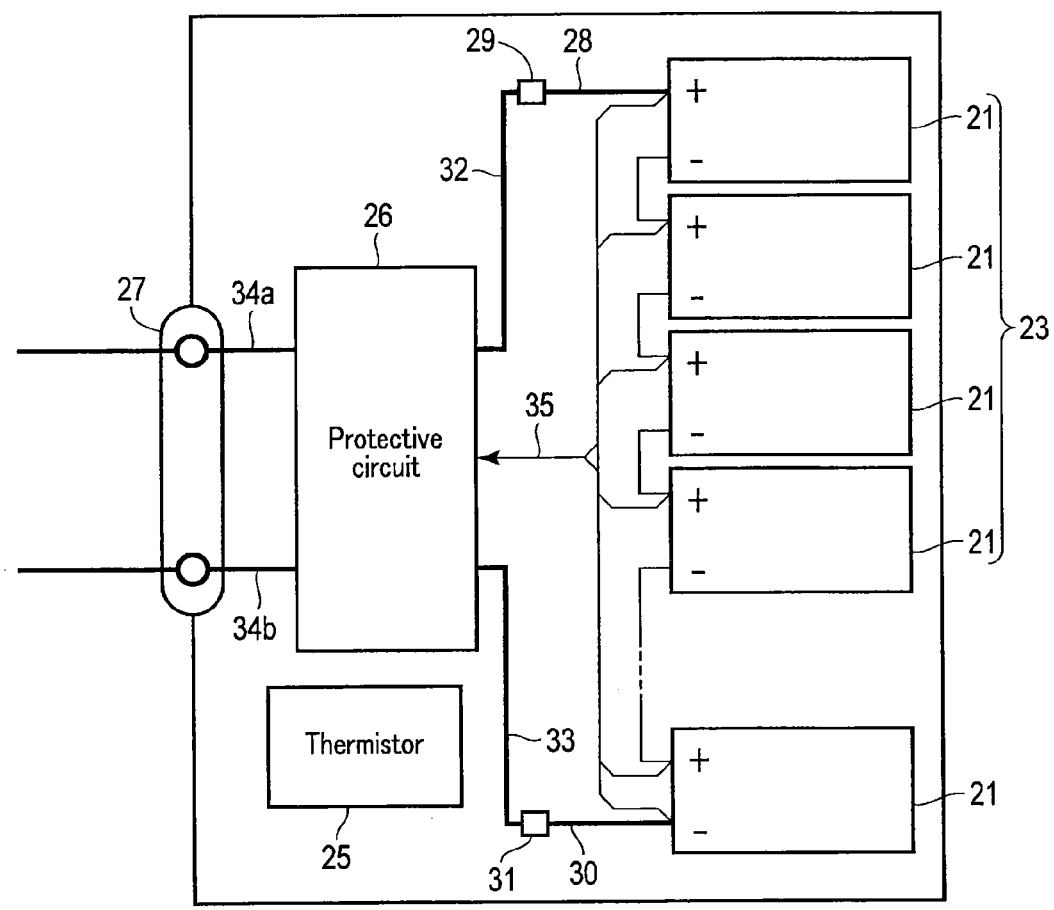
F I G. 6

NONAQUEOUS ELECTROLYTE BATTERY AND BATTERY PACK

CROSS-REFERENCE TO RELATED APPLICATION

This application is based upon and claims the benefit of priority from Japanese Patent Application No. 2014-156881, filed Jul. 31, 2014; the entire contents of which are incorporated herein by reference.

FIELD

Embodiments described herein relate generally to a nonaqueous electrolyte battery and a battery pack.

BACKGROUND

When lithium ion batteries and lead-acid batteries are used in combination, it is necessary to adjust the operating potential of the lithium ion battery to that of the lead-acid battery. An average operating potential of about 13.5 V is achieved by connecting in series, six batteries, in which a lithium-nickel-cobalt-manganese composite oxide is used for the positive electrode, and a spinel type lithium-titanium oxide is used for the negative electrode. Such lithium ion batteries can be used in combination with lead storage batteries. Lithium-titanium composite oxide undergoes only a slight volume change accompanying charge and discharge cycles and so has excellent cycle characteristics. Additionally, lithium metal is hardly deposited in a lithium absorption and release reaction of lithium-titanium composite oxide, in principle, and thus, performance degradation of batteries using lithium-titanium composite oxide is small, even after repeating charge and discharge cycles in large currents.

As such, when lithium ion batteries and lead-acid batteries are used in combination in vehicles or the like, low-temperature output performance at about 13 V, which is the working voltage of lead-acid batteries, is demanded. Unfortunately, the above batteries have a state of charge of 10 to 30% when a battery pack, in which six batteries are connected in series, is adjusted to 13 V. Therefore, there is a problem that the low-temperature output performance is low.

BRIEF DESCRIPTION OF THE DRAWINGS

FIG. 6 is a block diagram showing an electric circuit of the battery pack in FIG. 5.

DETAILED DESCRIPTION

According to one embodiment, a nonaqueous electrolyte battery includes a container, a positive electrode housed in the container, a negative electrode housed in the container, and a nonaqueous electrolyte housed in the container. The positive electrode includes a positive electrode active material represented by a general formula $LiMO_2$ (M is one or more elements selected from a group consisting of Ni, Co, and Mn). The negative electrode is spatially separated from the positive electrode and includes a titanium-containing oxide as a negative electrode active material. A potential of the positive electrode is 3.75 V or more vs. $Li/Li^+$, when an open circuit voltage of a nonaqueous electrolyte battery is 2.17 V.

First Embodiment

A nonaqueous electrolyte battery according to the first embodiment will be described.

The nonaqueous electrolyte battery according to the embodiment is a nonaqueous electrolyte battery including a container, a positive electrode housed in the container, the positive electrode including a positive electrode active material represented by a general formula $LiMO_2$ (M is one or more elements selected from a group consisting of Ni, Co, and Mn), a negative electrode housed in the container, the negative electrode being spatially separated from the positive electrode and including a titanium-containing oxide as a negative electrode active material, and a nonaqueous electrolyte housed in the container, wherein a potential of the positive electrode is 3.75 V or more vs. $Li/Li^+$, when an open circuit voltage of a nonaqueous electrolyte battery is 2.17 V. It is to be understood that a potential vs. $Li/Li^+$ means a potential measured using Li as a standard.

The discharge capacity per unit weight of the positive electrode active material, when the positive electrode is discharged from a potential of 3.75 V vs. $Li/Li^+$ to a cutoff potential of 1.5 V vs. $Li/Li^+$ at a discharge rate of 0.1 C, is set to be Qc. Also, the discharge capacity per unit weight of the negative electrode active material, when the negative electrode is discharged from a potential of 1.58 V vs. $Li/Li^+$ to a cutoff potential of 2.0 V vs. $Li/Li^+$ at a discharge rate of 0.1 C, is set to be Qa. The potential of the positive electrode, when the open circuit voltage of the nonaqueous electrolyte battery is 2.17 V, can be made to be 3.75 V or more, by making the ratio of the weight of the positive electrode active material to the weight of the negative electrode active material smaller than Qa/Qc.

Figure 1:
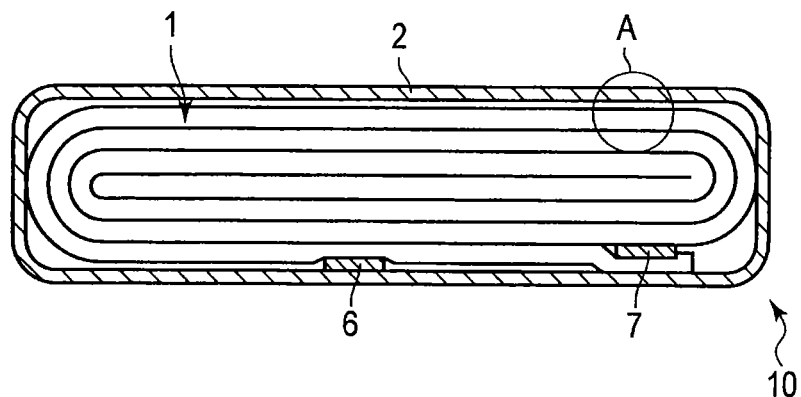
FIG. 1 is a cross-sectional view showing a flat nonaqueous electrolyte battery according to a first embodiment.
Figure 2:
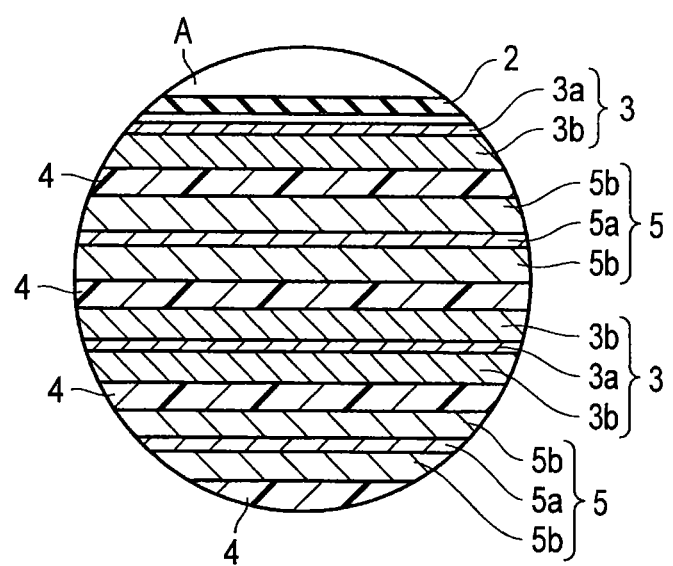
FIG. 2 is an enlarged cross-sectional view of part A in FIG. 1.

The nonaqueous electrolyte battery will be described in more detail with reference to FIGS. 1 and 2 showing an example of a nonaqueous electrolyte battery 10 according to the first embodiment. FIG. 1 is a cross-sectional view showing the flat nonaqueous electrolyte battery 10 according to the first embodiment, and FIG. 2 is an enlarged cross-sectional view of part A in FIG. 1. Each drawing is a typical view for description. Though there are parts different from an actual battery in shape, dimension, and ratio, these structural designs may be properly changed taking the following explanations and known technologies into consideration.

A flat wound electrode group 1 is housed in a bag-like container 2 made of a laminate film in which a metallic layer is interposed between two resin films. The flat wound electrode group 1 is formed by spirally winding and pressing a laminate, in which a negative electrode 3, a separator 4, a positive electrode 5, and another separator 4 are laminated, in this order from the outer side. The negative electrode 3 in the outermost layer has a configuration, in which, as shown in FIG. 2, a negative electrode active material-including layer 3b is formed on one inner side of a negative electrode current collector 3a. The other negative electrodes 3 are configured by forming the negative electrode active material-including layer 3b on both sides of the negative electrode current collector 3a. The positive electrode 5 is configured by forming a positive electrode active material-including layer 5b on both sides of a positive electrode current collector 5a.

Near an outer circumference of the wound electrode group 1, a negative electrode terminal 6 is electrically connected to the negative electrode current collector 3a of the negative electrode 3 in the outermost layer. Also, near the outer circumference of the wound electrode group 1, a positive electrode terminal 7 is electrically connected to the positive electrode current collector 5a of the positive electrode 5 on the inner side. The negative electrode terminal 6 and the positive electrode terminal 7 project out from an opening in the bag-like container 2. For example, a liquid nonaqueous electrolyte is injected through the opening of the bag-like container 2. The wound electrode group 1 and the liquid nonaqueous electrolyte are sealed by heat-sealing the opening in the bag-like container 2, sandwiching the negative electrode terminal 6 and the positive electrode terminal 7 in between.

Figure 3:
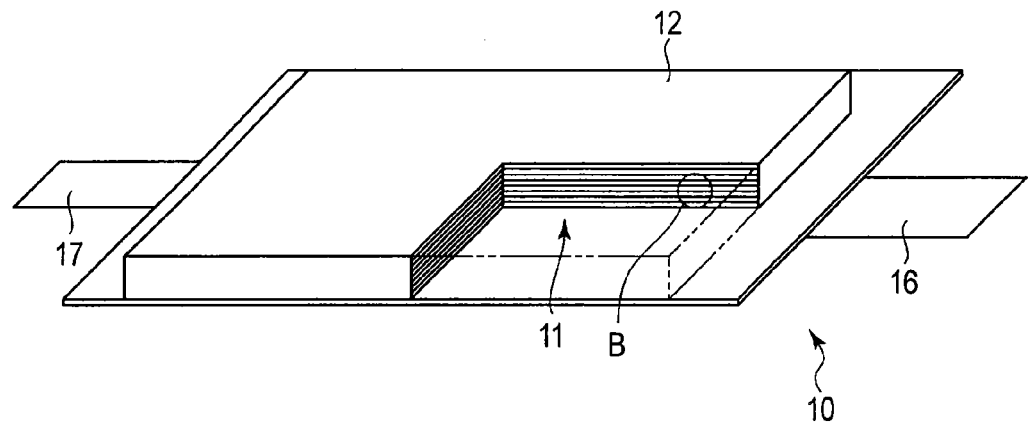
FIG. 3 is a partial cutout perspective view schematically showing another flat nonaqueous electrolyte battery according to the first embodiment.
Figure 4:
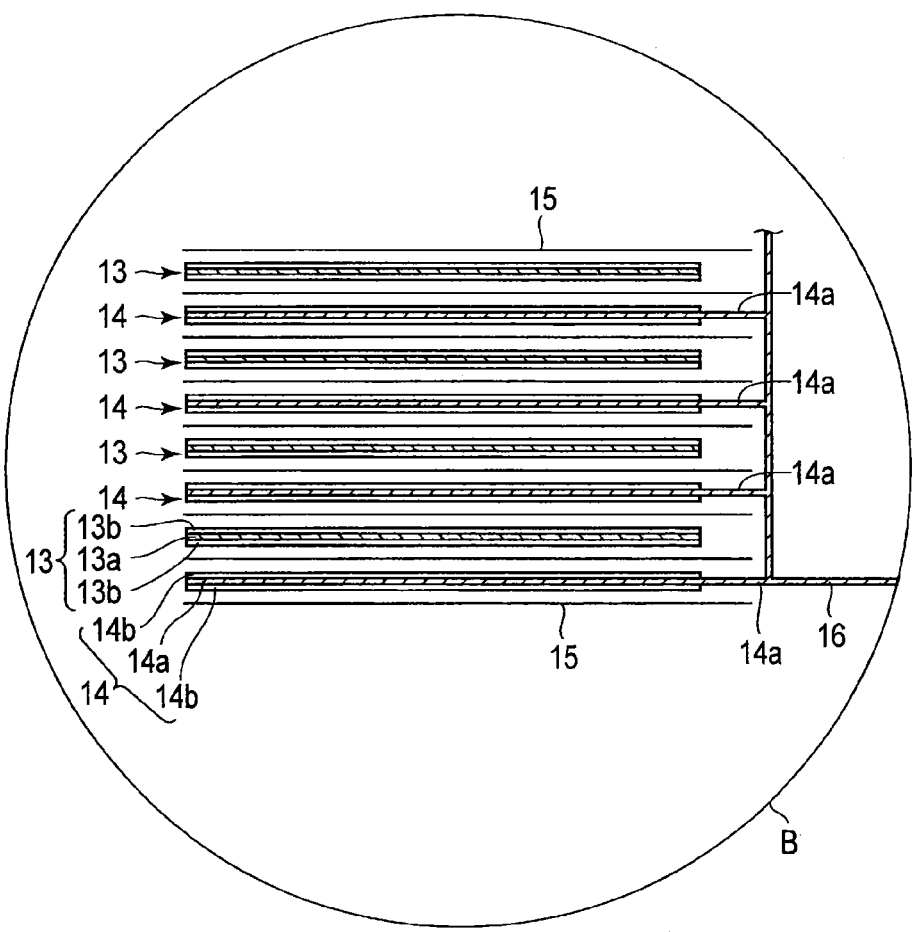
FIG. 4 is an enlarged cross-sectional view of part B in FIG. 3.

The nonaqueous electrolyte battery according to the first embodiment is not limited to the configuration shown in FIGS. 1 and 2 and may be configured, for example, as shown in FIGS. 3 and 4. FIG. 3 is a partial cutout perspective view schematically showing another flat nonaqueous electrolyte battery according to the first embodiment, and FIG. 4 is an enlarged sectional view of part B in FIG. 3.

A laminate electrode group 11 is housed in a container 12 made of a laminate film, in which a metallic layer is interposed between two resin films. The laminate electrode group 11 has, as shown in FIG. 4, a structure in which a positive electrode 13 and a negative electrode 14 are alternately laminated with a separator 15 interposed therebetween. A plurality of the positive electrodes 13 is present, and each of the plurality of positive electrodes includes a current collector 13a and a positive electrode active material-including layer 13b held on both surfaces of the current collector 13a. A plurality of the negative electrodes 14 is present, and each of the plurality of negative electrodes includes a current collector 14a and a negative electrode active material-including layer 14b held on both surfaces of the current collector 14a. One side of the current collector 14a of each of the negative electrodes 14 protrudes from the positive electrode 13. The protruding current collector 14a is electrically connected to a belt-like negative electrode terminal 16. One end of the belt-like negative electrode terminal 16 is drawn out of the container 12. Though not illustrated, one side of the current collector 13a, positioned opposite to the protruding side of the current collector 14a, protrudes from the negative electrode 14. The current collector 13a protruding from the negative electrode 14 is electrically connected to a belt-like positive electrode terminal 17. One end of the belt-like positive electrode terminal 17 is positioned on the opposite side of the negative electrode terminal 16. The one end of the belt-like positive electrode terminal 17 is drawn out of the container 12.

Hereinafter, the negative electrode, positive electrode, nonaqueous electrolyte, separator, container, positive electrode terminal, and negative electrode terminal used in a nonaqueous electrolyte battery in the present embodiment will be described in detail.

(Negative Electrode)

The negative electrode 3 includes the current collector 3a and the negative electrode active material-including layer 3b formed on one surface or both surfaces of the current collector 3a and including an active material, a conductive agent, and a binder.

The negative electrode active material includes a titanium-containing oxide. The titanium-containing oxide preferably includes at least one oxide selected from a group consisting of spinel type lithium-titanium composite oxide, orthorhombic crystal β-type titanium composite oxide, monoclinic crystal niobium-titanium composite oxide, ramsdellite type lithium-titanium composite oxide, hollandite type lithium-titanium composite oxide, anatase type titanium composite oxide, and rutile type titanium composite oxide.

As the titanium-containing oxide, for example, titanium-based oxides containing no lithium when the oxide is synthesized, lithium-titanium oxide, and lithium-titanium composite oxides in which a portion of elements constituting the lithium-titanium oxide is replaced with other elements can be cited. As the lithium-titanium oxide, for example, lithium titanates having a spinel structure (for example, $Li_{4+x}Ti_5O_{12}$ (x is a value that changes depending on states of charge and discharge, and $0 \leq x \leq 3$)), and ramsdellite type lithium titanates (for example, $Li_{2+y}Ti_3O_7$ (y is a value that changes depending on states charge and discharge, and $0 \leq y \leq 3$)), can be cited.

As the titanium-based oxide, $TiO_2$ and metal composite oxides containing Ti and at least one element selected from a group consisting of V, Sn, Cu, Ni, Co, and Fe can be cited. For example, titanium composite oxides having a monoclinic crystal β-type structure, which is one of crystal structures of $TiO_2$, include $TiO_2$ (B) and oxides obtained by replacing a portion of elements constituting $TiO_2$ (B) with other elements (for example, Li).

As the negative electrode active material, a plurality of the above titanium-containing oxides can be mixed and used. For example, a mixture of a spinel type lithium-titanium composite oxide and an orthorhombic crystal β-type titanium composite oxide, or a mixture of a spinel type lithium-titanium composite oxide and a monoclinic crystal niobium-titanium composite oxide can be used. In this case, if a ratio $w_1/w_2$ is less than ⅓, the discharge capacity per unit weight of the negative electrode active material when the negative electrode is discharged from a potential of 1.58 V vs. Li/Li$^+$ to a cutoff voltage of 2.0 V vs. Li/Li$^+$ at a discharge rate of 0.1 C is small. In the ratio $w_1/w_2$, $w_1$ is defined as the weight of the orthorhombic crystal β-type titanium composite oxide or the monoclinic crystal niobium-titanium composite oxide relative to the area of the negative electrode. In the ratio $w_1/w_2$, $w_2$ is defined as the weight of the spinel type lithium-titanium composite oxide relative to the area of the negative electrode. Thus, it is necessary to apply a larger amount of negative electrode active material relative to the area of the negative electrode, resulting in a lower energy density of the battery. Therefore, the ratio $w_1/w_2$ is preferably set to ⅓ or more.

The active material has a form including primary particles or secondary particles in which primary particles are aggregated. That is, the active material may include single primary particles and secondary particles in which primary particles are aggregated. In the active material including secondary particles and single primary particles, it is desirable that the diameter of primary particles is 0.1 μm to 10 μm, while the diameter of secondary particles is 1 μm to 30 μm. By setting the diameter of primary particles and the diameter of secondary particles to the above ranges, degradation of the active material due to a reaction with the nonaqueous electrolyte can be inhibited. The more desirable range of the diameter of primary particles is 0.5 µm to 3 µm. The more desirable range of the diameter of secondary particles is 10 µm to 20 µm.

The diameter of primary particles and the diameter of secondary particles of the active material can be measured by a laser diffraction method.

The conductive agent enhances current collection performance of the active material and suppresses contact resistance between the active material and the current collector. Examples of the conductive agent include acetylene black, carbon black, and graphite.

The binder binds the active material and the conductive agent. Examples of the binder include polytetrafluoroethylene (PTFE), polyvinylidene difluoride (PVdF), fluororubber, and styrene-butadiene rubber.

The active material, the conductive agent, and the binder in the negative electrode active material-including layer $3b$ are preferably mixed in a ratio of 70% to 96% by weight, 2% to 28% by weight, and 2% to 28% by weight, respectively. By setting the amount of the conductive agent to 2% or more by weight, current collection performance of the negative electrode active material-including layer $3b$ can be improved, and large current characteristics of the nonaqueous electrolyte battery 10 can be improved. By setting the amount of the binder to 2% or more by weight, binding between the negative electrode active material-including layer $3b$ and the current collector $3a$ can be enhanced, and cycle characteristics can be improved. On the other hand, the conductive agent and the binder are each preferably set to 28% or less by weight from the viewpoint of achieving a higher capacity.

The negative electrode current collector $3a$ is preferably, for example, copper foil, aluminum foil, or aluminum alloy foil. The aluminum alloy foil may include one or more of elements such as Mg, Ti, Zn, Mn, Fe, Cu, and Si.

The negative electrode 3 can be produced by the following method.

First, a slurry is prepared by suspending the negative electrode active material, the conductive agent, and the binder in a solvent. The slurry is applied to one surface or both surfaces of the negative electrode current collector $3a$ and dried. Then, the negative electrode active material-including layer $3b$ is formed by pressing the negative electrode current collector $3a$, to which the slurry has been applied, to produce the negative electrode 3. Alternatively, the negative electrode active material, the conductive agent, and the binder may be formed in a pellet shape, to form the negative electrode active material-including layer $3b$. Then, the negative electrode 3 may be produced by forming the pellet-shaped negative electrode active material-including layer $3b$ onto the negative electrode current collector $3a$.

(Positive Electrode)

The positive electrode 5 includes the positive electrode current collector $5a$ and the positive electrode active material-including layer $5b$. The positive electrode active material-including layer $5b$ includes a positive electrode active material, a conductive agent, and a binder. The positive electrode active material-including layer $5b$ is formed on one surface or both surfaces of the positive electrode current collector $5a$. The positive electrode active material includes an oxide represented by a general formula $LiMO_2$ (M includes one or more elements from Ni, Co, and Mn).

The conductive agent enhances current collection performance of the active material, and suppresses contact resistance between the active material and the current collector. Examples of the conductive agent include carbon materials such as acetylene black, carbon black, and graphite.

The binder binds the active material and the conductive agent. Examples of the binder include polytetrafluoroethylene (PTFE), polyvinylidene difluoride (PVdF), and fluororubber.

The active material, the conductive agent, and the binder in the positive electrode active material-including layer $5b$ are preferably mixed in a ratio of 80% to 95% by weight, 3% to 18% by weight, and 2% to 17% by weight, respectively. The conductive agent can achieve the above effect by setting the ratio thereof to 3% or more by weight. By setting the ratio of the conductive agent to 18% or less by weight, the decomposition of the nonaqueous electrolyte at the surface of the conductive agent during storage at high temperature can be reduced. The binder provides sufficient strength by setting the ratio thereof to 2% or more by weight. By setting the ratio of the binder to 17% or less by weight, the amount of the binder as an insulating material mixed in the positive electrode can be reduced, thereby reducing the internal resistance.

The positive electrode current collector $5a$ is preferably, for example, aluminum foil or aluminum alloy foil. The aluminum alloy foil may include one or more of elements such as Mg, Ti, Zn, Mn, Fe, Cu, and Si.

The positive electrode 5 can be produced by, for example, the following method.

First, a slurry is prepared by suspending the positive electrode active material, the conductive agent, and the binder in a solvent. The slurry is applied to one surface or both surfaces of the positive electrode current collector $5a$ and dried. Then, the positive electrode active material-including layer $5b$ is formed by pressing the positive electrode current collector $5a$, to which the slurry has been applied, to produce the positive electrode 5. Alternatively, the positive electrode active material, the conductive agent, and the binder may be formed in a pellet shape, to form the positive electrode active material-including layer $5b$. Then, the positive electrode 5 may be produced by forming the pellet-shaped positive electrode active material-including layer $5b$ onto the positive electrode current collector $5a$.

(Nonaqueous Electrolyte)

As the nonaqueous electrolyte, for example, a liquid nonaqueous electrolyte prepared by dissolving an electrolyte in a nonaqueous solvent or a gel-form nonaqueous electrolyte that is a composite of a liquid electrolyte and a polymeric material may be used.

The liquid nonaqueous electrolyte is preferably prepared by dissolving an electrolyte in a nonaqueous solvent at a concentration of 0.5 M to 2.5 M.

Examples of the electrolyte include lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$), lithium bis-trifluoromethylsulfonylimide [$LiN(CF_3SO_2)_2$], or mixtures thereof. The electrolyte is preferably difficult to oxidize, even at a high potential, and $LiPF_6$ is particularly preferable.

Examples of the nonaqueous solvent include cyclic carbonates such as propylene carbonate (PC), ethylene carbonate (EC), and vinylene carbonate, alkyl carbonates such as diethyl carbonate (DEC), dimethyl carbonate (DMC), and methyethyl carbonate (MEC), cyclic ethers such as tetrahydrofuran (THF), 2-methyl tetrahydrofuran (2MeTHF), and dioxolane (DOX), alkyl ethers such as dimethoxy-ethane (DME) and diethoethane (DEE), γ-butyrolactone (GBL), acetonitrile (AN), and sulfolane (SL). These nonaqueous solvents can be used alone or in a form of mixed solvents.

Examples of the polymeric material include polyvinylidene difluoride (PVdF), polyacrylonitrile (PAN), and polyethylene oxide (PEO).

The nonaqueous solvent is preferably a mixed solvent, in which at least two nonaqueous solvents from a group consisting of propylene carbonate (PC), ethylene carbonate (EC), and diethyl carbonate (DEC) are mixed, or a mixed solvent including γ-butyrolactone (GBL). By using these mixed solvents, a nonaqueous electrolyte battery with excellent high-temperature characteristics can be obtained.

(Separator)

A porous film or a nonwoven fabric made of synthetic resin formed from a material such as polyethylene, polypropylene, cellulose, or polyvinylidene difluoride (PVdF) can be used as the separator 4. Among others, the porous film made of polyethylene or polypropylene melts at a fixed temperature and can shut off a current, and is therefore preferable from the viewpoint of safety.

(Container)

A bag-like container made of laminate film or a container made of metal is used as the container 2.

A multi-layer film in which a metallic layer is interposed between resin films is used as a laminate film. The metallic layer is preferably aluminum foil or aluminum alloy foil, for the reduction of weight. As the resin film, for example, a polymeric material such as polypropylene (PP), polyethylene (PE), nylon, or polyethylene terephthalate (PET) can be used. The laminate film can be molded into a shape of a container by heat-sealing. The laminate film preferably has a thickness of 0.2 mm or less.

The container made of metal can be formed from aluminum or aluminum alloy. The aluminum alloy preferably includes one or more of elements such as magnesium, zinc, and silicon. On the other hand, the content of transition metals such as iron, copper, nickel, and chromium is preferably set to 100 ppm or less. Accordingly, long-term reliability in a high-temperature environment and heat dissipation properties can be improved dramatically. The container made of metal desirably has a thickness of 0.5 mm or less, and the container more desirably has a thickness of 0.2 mm or less.

Examples of the shape of a battery include a flat form, an angular form, a cylindrical form, a coin foam, a button form, a sheet form, and a laminate form. Naturally, in addition to a small battery mounted in mobile electronic devices, the battery may be a large battery mounted on two-wheeled or four-wheeled vehicles.

(Positive Electrode Terminal)

The positive electrode terminal 7 is formed from a material having an electrically stable potential in the range of 3.0 to 4.5 V vs. $Li/Li^+$, and at the same time, having electrical conductivity. The positive electrode terminal 7 is preferably formed from aluminum or an aluminum alloy. The aluminum alloy may include one or more of elements such as Mg, Ti, Zn, Mn, Fe, Cu, and Si. The positive electrode terminal 7 is preferably formed from the same material as that of the positive electrode current collector 5a, to reduce the contact resistance with the positive electrode current collector 5a.

(Negative Electrode Terminal)

The negative electrode terminal 6 is formed from a material having an electrically stable potential in the range of 0.4 to 3.0 V vs. $Li/Li^+$, and at the same time, having electrical conductivity. The negative electrode terminal 6 is preferably formed from aluminum or an aluminum alloy. The aluminum alloy may include elements such as Mg, Ti, Zn, Mn, Fe, Cu, and Si. The negative electrode terminal 6 is preferably formed from the same material as that of the negative electrode current collector 3a, to reduce the contact resistance with the negative electrode current collector 3a.

Second Embodiment

Next, a battery pack according to an embodiment will be described in detail.

The battery pack according to the second embodiment includes one or more nonaqueous electrolyte batteries (that is, unit cells) according to the first embodiment. When a plurality of unit cells is included in the battery pack, each unit cell is arranged, such that the unit cells are electrically connected in series, in parallel, or in series and in parallel.

When the battery pack according to the embodiment is used for a system including lead-acid batteries, it is preferable to connect 6 n or 5 n (n is equal to 1 or greater) nonaqueous electrolyte batteries according to the first embodiment in series.

A battery pack 20 will concretely be described with reference to FIGS. 5 and 6. In the battery pack 20 shown in FIG. 5, the flat nonaqueous electrolyte secondary battery shown in FIGS. 1 and 3 can be used as a unit cell 21.

A plurality of the unit cells 21 is stacked such that the externally projected negative electrode terminal 6 and positive electrode terminal 7 are aligned in the same direction and fastened by an adhesive tape 22 to constitute a battery module 23. As shown in FIG. 6, these unit cells 21 are electrically connected in series to each other.

A printed wiring board 24 is arranged opposite to the side surface of the unit cells 21, from which the negative electrode terminal 6 and the positive electrode terminal 7 project. As shown in FIG. 6, a thermistor 25, a protective circuit 26, and a conducting terminal 27 that conducts electricity to external devices are mounted on the printed wiring board 24. Additionally, an electric insulating plate (not shown) is mounted on the surface of the printed wiring board 24 opposite to the battery module 23 to avoid unnecessary connection to wires of the battery module 23.

A positive electrode lead 28 is connected to the positive electrode terminal 7 positioned in the lowermost layer of the battery module 23. One end of the positive electrode lead 28 is inserted into a positive electrode connector 29 of the printed wiring board 24, and thereby electrically connecting the positive electrode lead 28 to the printed wiring board 24. A negative electrode lead 30 is connected to the negative electrode terminal 6 positioned in the uppermost layer of the battery module 23. One end of the negative electrode lead 30 is inserted into a negative electrode connector 31 of the printed wiring board 24, thereby electrically connecting the negative electrode lead 30 to the printed wiring board 24. The connectors 29 and 31 are connected to the protective circuit 26 via wires 32 and 33 formed on the printed wiring board 24.

The thermistor 25 detects the temperature of the unit cell 21. A detection signal of the thermistor 25 is sent to the protective circuit 26. The protective circuit 26 can disconnect a positive-side wire 34a and a negative-side wire 34b between the protective circuit 26 and the conducting terminal 27 under a predetermined condition. The predetermined condition is, for example, when the temperature detected by the thermistor 25 rises to a predetermined temperature or higher. Also, the predetermined condition is when an over-charge, an over-discharge, or an over-current of the unit cell 21 is detected. An over-charge or the like is detected for an individual unit cell 21 or all of the unit cells 21 as a whole. When an individual unit cell 21 is detected, the battery voltage may be detected, or the positive electrode potential or negative electrode potential may be detected. In the latter case, a lithium electrode used as a reference electrode is inserted into each of the individual unit cells 21. In the case of FIGS. 5 and 6, a wire 35 for voltage detection is connected to each of the unit cells 21. A detection signal is sent to the protective circuit 26 through these wires 35.

A protective sheet 36 made of rubber or resin is arranged on each of three side surfaces of the battery module 23 excluding the side surface from which the positive electrode terminal 7 and the negative electrode terminal 6 project.

The battery module 23 is housed in a housing container 37 together with each of the protective sheets 36 and the printed wiring board 24. That is, the protective sheet 36 is arranged on each of both inner side surfaces along a long-side direction and an inner side surface along a short-side direction of the housing container 37. In addition, the printed wiring board 24 is arranged on an inner side surface opposite to the protective sheet 36 that is arranged along the short-side direction. The battery module 23 is positioned in a space surrounded by the protective sheets 36 and the printed wiring board 24. A cover 38 is mounted on the top surface of the housing container 37.

Instead of the adhesive tape 22, a heat-shrinkage tape may be used to fix the battery module 23. In this case, the protective sheet is arranged on both side surfaces of the battery module, and after the heat-shrinkage tape is wound around the battery module and protective sheets, the heat-shrinkage tape is allowed to heat-shrink to bind the battery module together.

Figure 5:
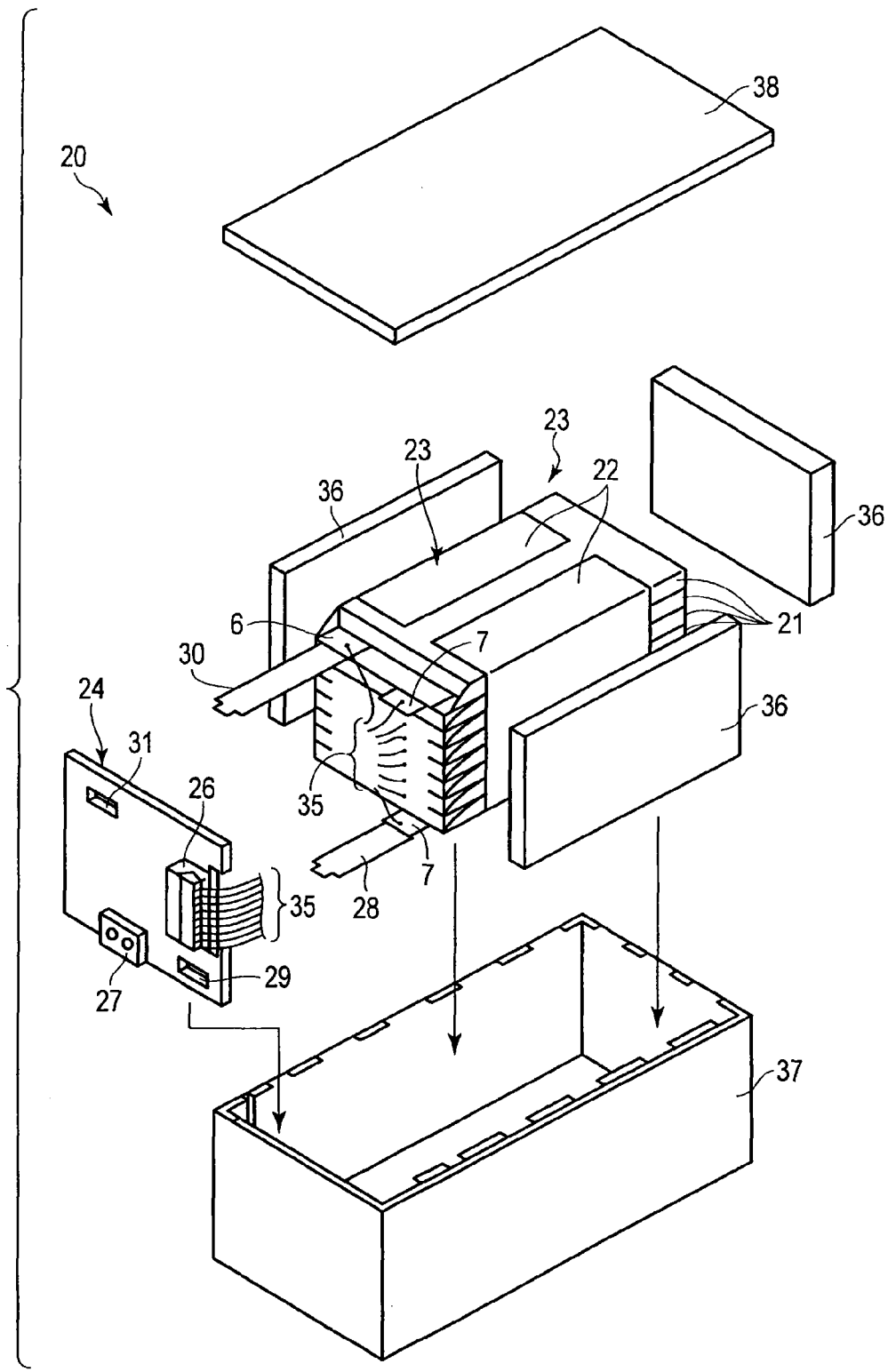
FIG. 5 is an exploded perspective view showing an exemplary battery pack according to a second embodiment.

While FIGS. 5 and 6 show an embodiment in which the unit cells 21 are connected in series, the unit cells may be connected in parallel or the connection in series and in parallel may be combined, to increase the battery capacity. In addition, assembled battery packs may further be connected in series or in parallel.

According to the present embodiment described above, a battery pack having excellent charge and discharge cycle performance can be provided by including the nonaqueous electrolyte battery of the first embodiment having excellent charge and discharge cycle performance.

The form of the battery pack is appropriately changed in accordance with its use. The use is preferably one in which favorable cycle characteristics are desired along with large current characteristics. More specifically, uses of the battery pack are for the power supply of digital cameras and for vehicles such as two-wheeled and four-wheeled hybrid electric cars, two-wheeled and four-wheeled electric cars, and assisted bicycles. Particularly, battery packs using non-aqueous electrolyte batteries excellent in high-temperature characteristics are suitably used for vehicles.

EXAMPLES

Examples will be described below, but the present invention is not limited to the examples described below, so long as the present invention does not deviate from the scope and spirit thereof.

Example 1

Production of a Positive Electrode

A powder of lithium-nickel composite oxide ($LiNi_{0.5}Co_{0.2}Mn_{0.3}O_2$) (90 wt %) was used as the positive electrode active material. Acetylene black (3 wt %) and graphite (3 wt %) were used as the conductive agent. Polyvinylidene difluoride (PVdF) (4 wt %) was used. The above components were added to N-methylpyrolidone (NMP) and mixed to prepare a slurry. The slurry was applied to both surfaces of a current collector made of aluminum foil having a thickness of 15 μm and dried. The current collector, to which the slurry had been applied, was pressed to obtain a positive electrode.

<Production of a Negative Electrode>

A powder of monoclinic crystal niobium-titanium composite oxide ($Nb_2TiO_7$) (90 wt %) was used as the negative electrode active material. Graphite (7 wt %) was used as the conductive agent. Polyvinylidene difluoride (PVdF) (3 wt %) was used as the binder. These components were added to N-methylpyrolidone (NMP) and mixed to prepare a slurry. The slurry was applied to both surfaces of a current collector made of aluminum foil having a thickness of 15 μm and dried. The current collector, to which the slurry had been applied, was pressed to obtain a negative electrode. The ratio of the weight of the positive electrode active material to the weight of the negative electrode active material was set to 1.4.

<Production of an Electrode Group>

As separators, nonwoven fabric made of cellulose having a thickness of 25 μm were used.

The positive electrode, the separator, the negative electrode, and the separator were stacked in this order to obtain a laminate. Next, the laminate was spirally wound. The wound laminate was hot-pressed at 80° C. to produce a flat electrode group. The obtained electrode group was housed in a pack made of a laminate film having a thickness of 0.1 mm and a three-layer structure of nylon layer, aluminum layer, and polyethylene layer and dried in vacuum at 80° C. for 16 hours.

<Preparation of a Liquid Nonaqueous Electrolyte>

1 mol/L of $LiPF_6$ as an electrolyte was dissolved in a mixed solvent (volume ratio 1:2) of propylene carbonate (PC) and diethyl carbonate (DEC) to obtain a nonaqueous electrolytic solution.

After pouring the nonaqueous electrolytic solution into the laminate film pack housing the electrode group, the pack was sealed by heat-sealing. Accordingly, a nonaqueous electrolytic solution battery was obtained.

The positive electrode active material, the negative electrode active material, the ratio of the weight of the positive electrode active material to the weight of the negative electrode active material, and the potential of the positive electrode when the cell open circuit voltage is 2.17 V are shown in Table 1.

Examples 2 to 16, Comparative Examples 1 to 10

Nonaqueous electrolyte batteries were produced in the same manner as in Example 1 except that the positive electrode active material, the negative electrode active material, the ratio of the weight of the positive electrode active material to the weight of the negative electrode active material, and the potential of the positive electrode when the cell open circuit voltage is 2.17 V were changed as shown in Table 1.

Table 1 shows direct current resistances of the nonaqueous electrolyte batteries according to Examples 1 to 16 and Comparative Examples 1 to 10 during charge and discharge cycles at a temperature of 0° C. and a rate of 10 C when the open circuit voltage is 2.17 V, referred to as 0° C.-10 C DC resistances, herein. 0° C.-10 C DC resistances of batteries when the open circuit voltage is 2.17 V in Examples 1 to 16 show lower values than DC resistances in Comparative Examples 1 to 10.

The above result shows that the capacity of the positive electrode at a cell open circuit voltage of 2.17 V or lower is increased and output performance is improved, by using titanium-containing oxide as the negative electrode active material and selecting the ratio of the weight of the positive electrode active material to the weight of the negative electrode active material such that the potential of the positive electrode is 3.75 V or more when the cell open circuit voltage is 2.17 V.

TABLE 1

| | Positive Electrode Active Material | Negative Electrode Active Material | Ratio of Weight of Positive Electrode Active Material to Weight of Negative Electrode Active Material | Positive Electrode Potential when Cell Open Circuit Voltage is 2.17 V (V vs. Li/Li+) | 0° C.-10 C. DC Resistance when Cell Open Circuit Voltage is 2.17 V (mΩ) |
|---|---|---|---|---|---|
| Example 1 | $LiNi_{0.5}Co_{0.2}Mn_{0.3}O_2$ | monoclinic $Nb_2TiO_7$ | 1.4 | 3.75 | 50 |
| Example 2 | $LiNi_{0.5}Co_{0.2}Mn_{0.3}O_2$ | monoclinic $Nb_2TiO_7$ | 1.6 | 3.80 | 48 |
| Example 3 | $LiNi_{0.5}Co_{0.2}Mn_{0.3}O_2$ | orthorhombic β type $TiO_2$ (B) | 1.7 | 3.75 | 52 |
| Example 4 | $LiNi_{0.5}Co_{0.2}Mn_{0.3}O_2$ | ramsdellite type $Li_2Ti_3O_7$ | 1.1 | 3.75 | 56 |
| Example 5 | $LiNi_{0.5}Co_{0.2}Mn_{0.3}O_2$ | hollandite type $K_2Ti_7NO_{16}$ | 1.1 | 3.75 | 57 |
| Example 6 | $LiNi_{0.5}Co_{0.2}Mn_{0.3}O_2$ | anatase type $TiO_2$ | 1.5 | 3.75 | 57 |
| Example 7 | $LiNi_{0.5}Co_{0.2}Mn_{0.3}O_2$ | rutile type $TiO_2$ | 1.5 | 3.75 | 56 |
| Example 8 | $LiNi_{0.5}Co_{0.2}Mn_{0.3}O_2$ | monoclinic $Nb_2TiO_7$ 50 wt % and spinel type $Li_4Ti_5O_{12}$ 50 wt % | 1.3 | 3.75 | 51 |
| Example 9 | $LiNi_{0.5}Co_{0.2}Mn_{0.3}O_2$ | orthorhombic β type $TiO_2$(B) 50 wt % and spinel type $Li_4Ti_5O_{12}$ 50 wt % | 1.5 | 3.75 | 51 |
| Example 10 | $LiNi_{0.5}Co_{0.2}Mn_{0.3}O_2$ | monoclinic $Nb_2TiO_7$ 40 wt % and spinel type $Li_4Ti_5O_{12}$ 60 wt % | 1.2 | 3.75 | 51 |
| Example 11 | $LiNi_{0.5}Co_{0.2}Mn_{0.3}O_2$ | orthorhombic β type $TiO_2$(B) 40 wt % and spinel type $Li_4Ti_5O_{12}$ 60 wt % | 1.4 | 3.75 | 50 |
| Example 12 | $LiNi_{0.8}Co_{0.1}Mn_{0.1}O_2$ | monoclinic $Nb_2TiO_7$ | 1.2 | 3.75 | 51 |
| Example 13 | $LiNi_{0.34}Co_{0.33}Mn_{0.33}O_2$ | monoclinic $Nb_2TiO_7$ | 1.6 | 3.75 | 48 |
| Example 14 | $LiNi_{0.5}Mn_{0.5}O_2$ | monoclinic $Nb_2TiO_7$ | 1.3 | 3.75 | 53 |
| Example 15 | $LiNiO_2$ | monoclinic $Nb_2TiO_7$ | 1.1 | 3.75 | 53 |
| Example 16 | $LiMn_{2/3}Li_{1/3}O_2$ | monoclinic $Nb_2TiO_7$ | 1.0 | 3.75 | 59 |
| Comparative Example 1 | $LiNi_{0.5}Co_{0.2}Mn_{0.3}O_2$ | spinel type $Li_4Ti_5O_{12}$ | 1.1 | 3.72 | 60 |
| Comparative Example 2 | $LiNi_{0.5}Co_{0.2}Mn_{0.3}O_2$ | monoclinic $Nb_2TiO_7$ | 2.0 | 3.72 | 62 |
| Comparative Example 3 | $LiNi_{0.5}Co_{0.2}Mn_{0.3}O_2$ | orthorhombic β type $TiO_2$ (B) | 1.9 | 3.72 | 61 |
| Comparative Example 4 | $LiNi_{0.5}Co_{0.2}Mn_{0.3}O_2$ | monoclinic $Nb_2TiO_7$ 30 wt % and spinel type $Li_4Ti_5O_{12}$ 70 wt % | 1.3 | 3.72 | 60 |
| Comparative Example 5 | $LiNi_{0.5}Co_{0.2}Mn_{0.3}O_2$ | orthorhombic β type $TiO_2$(B) 30 wt % and spinel type $Li_4Ti_5O_{12}$ 70 wt % | 1.5 | 3.72 | 60 |
| Comparative Example 6 | $LiNi_{0.8}Co_{0.1}Mn_{0.1}O_2$ | spinel type $Li_4Ti_5O_{12}$ | 0.9 | 3.72 | 64 |
| Comparative Example 7 | $LiNi_{0.34}Co_{0.33}Mn_{0.33}O_2$ | spinel type $Li_4Ti_5O_{12}$ | 1.1 | 3.72 | 60 |
| Comparative Example 8 | $LiNi_{0.5}Mn_{0.5}O_2$ | spinel type $Li_4Ti_5O_{12}$ | 1.0 | 3.72 | 61 |
| Comparative Example 9 | $LiNiO_2$ | spinel type $Li_4Ti_5O_{12}$ | 0.9 | 3.72 | 63 |
| Comparative Example 10 | $LiMn_{2/3}Li_{1/3}O_2$ | spinel type $Li_4Ti_5O_{12}$ | 0.8 | 3.72 | 64 |

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A nonaqueous electrolyte battery comprising:
a container;
a positive electrode housed in the container, the positive electrode comprising a positive electrode active material represented by a general formula $LiMO_2$ where M is one or more elements selected from a group consisting of Ni, Co, and Mn;
a negative electrode housed in the container, the negative electrode being spatially separated from the positive electrode and including a titanium-containing oxide as a negative electrode active material; and
a nonaqueous electrolyte housed in the container, wherein a potential of the positive electrode is 3.75 V or more vs. $Li/Li^+$, when an open circuit voltage of the nonaqueous electrolyte battery is 2.17 V, and wherein the titanium-containing oxide comprises a spinel type lithium-titanium composite oxide and an orthorhombic crystal β-type titanium composite oxide, and a ratio $w_1/w_2$ is 2/3 or more, where $w_1$ is a weight of the orthorhombic crystal β-type titanium composite oxide relative to an area of the negative electrode and $w_2$ is a weight of the spinel type lithium-titanium composite oxide relative to an area of the negative electrode.

2. The nonaqueous electrolyte battery according to claim 1, wherein the titanium-containing oxide comprises one oxide selected from the group consisting of a spinel type lithium-titanium composite oxide, orthorhombic crystal β-type titanium composite oxide, monoclinic crystal niobium-titanium composite oxide, ramsdellite type lithium-titanium composite oxide, hollandite type lithium-titanium composite oxide, anatase type titanium composite oxide, and rutile type titanium composite oxide.

3. The nonaqueous electrolyte battery according to claim 1, wherein when a discharge capacity per unit weight of the positive electrode active material during discharge of the positive electrode from a potential of 3.75 V vs. Li/Li$^+$ to a cutoff potential of 1.5 V vs. Li/Li$^+$ at a discharge rate of 0.1 C is Qc, and a discharge capacity per unit weight of the negative electrode active material during discharge of the negative electrode from a potential of 1.58 V vs. Li/Li$^+$ to a cutoff potential of 2.0 V vs. Li/Li$^+$ at a discharge rate of 0.1 C is Qa, a ratio of a weight of the positive electrode active material to a weight of the negative electrode active material is smaller than Qa/Qc.

4. The nonaqueous electrolyte battery according to claim 1, wherein the titanium-containing oxide comprises a spinel type lithium-titanium composite oxide and a monoclinic crystal niobium-titanium composite oxide, and a ratio $w_1/w_2$ is ⅓ or more, where $w_1$ is a weight of the monoclinic crystal niobium-titanium composite oxide relative to an area of the negative electrode and $w_2$ is a weight of the spinel type lithium-titanium composite oxide relative to an area of the negative electrode.

5. The nonaqueous electrolyte battery according to claim 1, wherein the container is formed from a laminate film.

6. A battery pack comprising one or more of the nonaqueous electrolyte battery according to claim 1.

7. A battery pack comprising 6 n or 5 n of the nonaqueous electrolyte battery according to claim 1, the nonaqueous electrolyte batteries connected in a series, and n being 1 or greater.

8. The battery pack according to claim 6, further comprising: a plurality of nonaqueous electrolyte batteries that are electrically connected; and a protective circuit capable of detecting a voltage of each of the nonaqueous electrolyte batteries.

9. A vehicle comprising the battery pack according to claim 6.

10. A battery pack comprising a plurality of nonaqueous electrolyte batteries according to claim 1 connected in a series.

11. The nonaqueous electrolyte battery according to claim 1, wherein the negative electrode active material comprises 40 wt. % orthorhombic β type $TiO_2(B)$ and 60 wt. % spinel type $Li_4Ti_5O_{12}$.

* * * * *